United States Patent [19]
Bertwell et al.

[11] Patent Number: 5,485,807
[45] Date of Patent: Jan. 23, 1996

[54] HAND-HELD BRUSH

[75] Inventors: Dale E. Bertwell, Denver; Joseph P. Markham, Arvada, both of Colo.

[73] Assignee: B & G Ventures, Inc., Denver, Colo.

[21] Appl. No.: 225,566

[22] Filed: Apr. 11, 1994

Related U.S. Application Data

[63] Continuation-in-part of Ser. No. 162,269, Dec. 7, 1993, abandoned, which is a continuation-in-part of Ser. No. 13,697, Sep. 30, 1993, Pat. No. Des. 356,685.

[51] Int. Cl.⁶ .................................................. A01K 13/00
[52] U.S. Cl. .................................................. 119/93
[58] Field of Search ............................ 119/93, 83, 85, 119/86, 94; 15/143.1, 187, 159.1, 188

[56] References Cited

U.S. PATENT DOCUMENTS

| | | | |
|---|---|---|---|
| 1,540,202 | 6/1925 | Zerilli | 15/143.1 X |
| 2,075,413 | 3/1937 | Welker | 15/188 |
| 2,273,207 | 2/1942 | Kuhn | 15/143.1 X |
| 2,544,406 | 3/1951 | Weems | 15/143.1 X |
| 2,674,758 | 4/1954 | Fay | 15/143.1 X |
| 2,958,889 | 11/1960 | Greerblatt | 15/187 |
| 3,047,898 | 8/1962 | Levitt | 15/139.1 X |
| 5,187,829 | 2/1993 | Atkins | 15/143.1 X |

*Primary Examiner*—Thomas Price
*Attorney, Agent, or Firm*—Fields, Lewis, & Rost

[57] ABSTRACT

A hand-held brush is provided for grooming. The brush comprises a body section and a head section connected therebetween. The body section includes two opposing half curved portions and a base portion. The head section includes two opposing half oval portions, first and second protruding ears, and a crown portion connecting the ears. The closed figure achieved by the combination of these elements results in the outline of any number of different types of animals. Attached to a bottom side of the brush are a plurality of cone shaped bristles. The brush is flexible such that the body and head sections flex independently and continuously along the surface of the animal being brushed. The bristles also substantially conform to the surface being brushed and are made of the same material as the body and head sections.

6 Claims, 3 Drawing Sheets

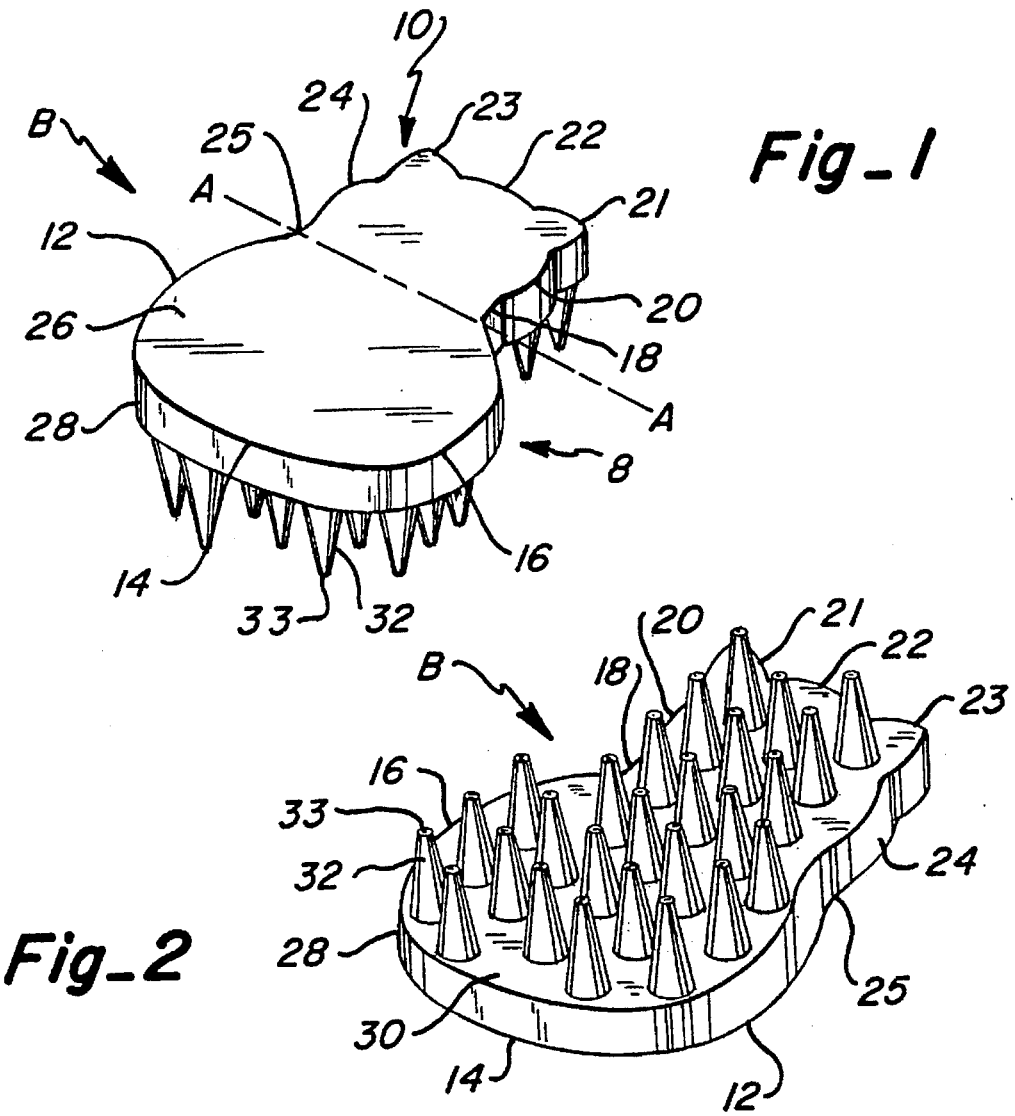
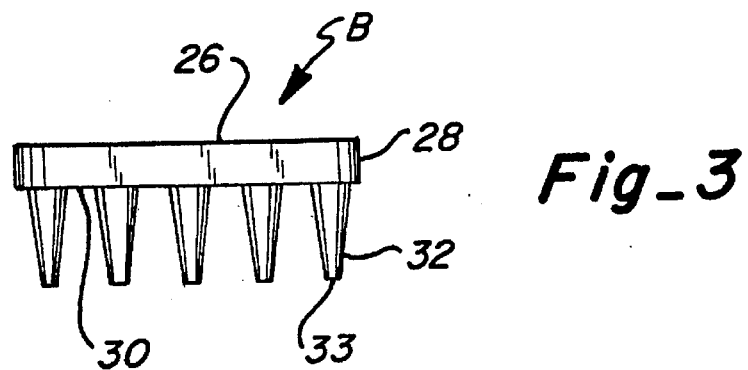

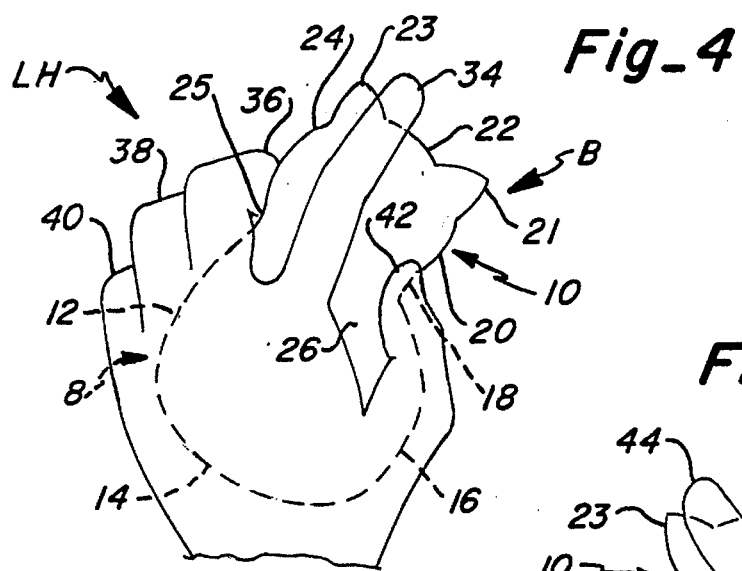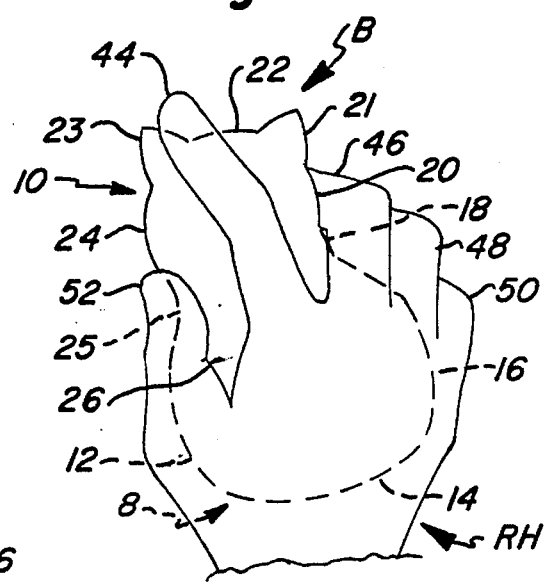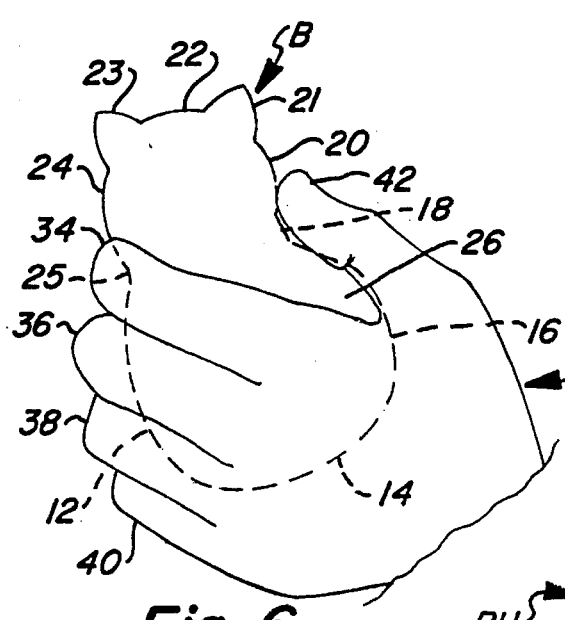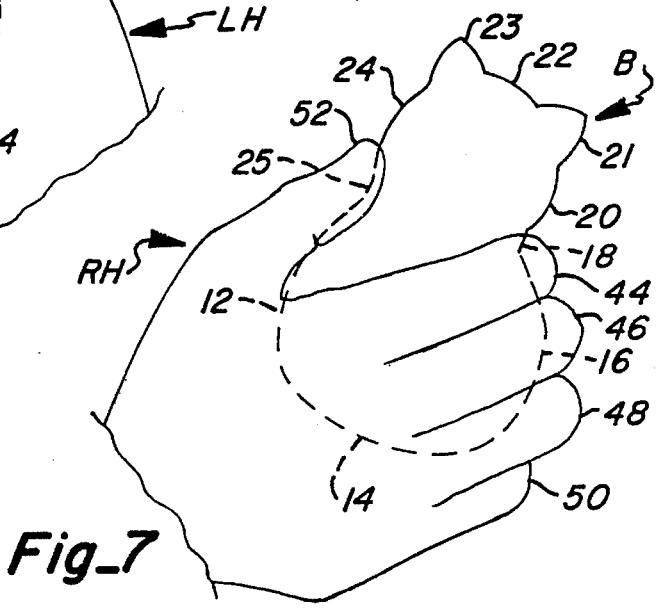

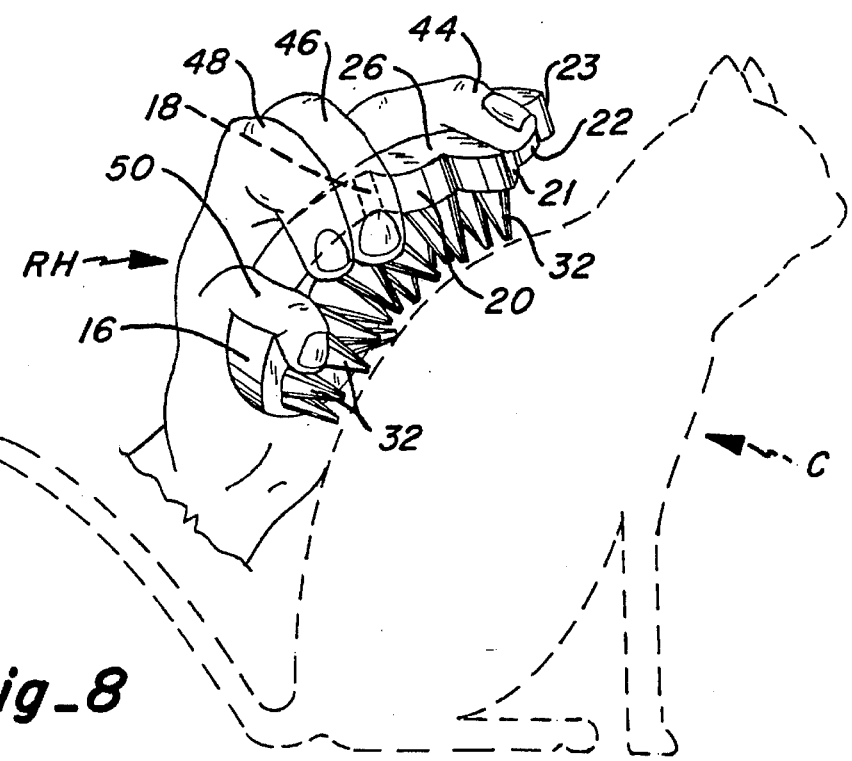
Fig_8
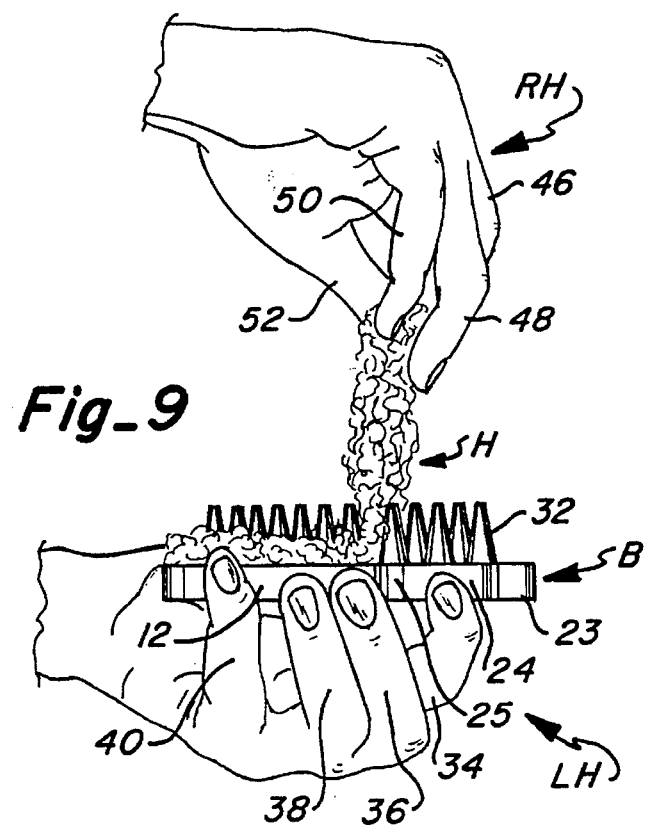
Fig_9

5,485,807

HAND-HELD BRUSH

This is a continuation-in-part application of U.S. patent application Ser. No. 08/162,269, filed Dec. 7, 1993 now abandoned and entitled "Hand-Held Brush", which is a continuation-in-part application of U.S. patent application Ser. No. 29/013,697, filed Sep. 30, 1993 now U.S. Pat. No. 356,685 and entitled "Brush With Cat Design".

TECHNICAL FIELD

This invention relates to a brush for grooming, and more particularly to one which may be used for the grooming of domestic animals.

BACKGROUND ART

Hair brushes are a common item of use that comprise generally of a handle, brush body and bristles. The brush handle is usually rectangular or cylindrical. The body portion may typically be found in a circular or oval shape. A common characteristic of these brushes is that the handles do not readily conform to one's hand nor do the brush bodies or bristles conform to the shape of the surface being brushed.

One object of this invention is to provide a brush that easily conforms to the user's hand. The structure of the disclosed brush is such that it allows a multitude of hand positions for which to grasp the brush. It is another object of this invention to provide an aesthetically pleasing shape. It is yet another object of this invention to provide a brush body which may be flexed to conform to the surface being brushed. It is an additional object to provide a brush which has bristles that also conform to the surface being brushed. While the common brush may be satisfactory for its intended purpose, such brushes do not disclose the novel elements suggested by the present invention.

DISCLOSURE OF THE INVENTION

In accordance with this invention, a hand-held brush is provided which has first and second half curve sections connected therebetween by a base portion to form a body section. Adjacent to and attached to the first half curve portion is a first half oval portion. Integral with the first half oval portion is a first protruding ear. A concave portion with flat area serves to connect the second half curve portion to the second half oval portion. Integral with the second half oval portion is a second protruding ear. A crown section defines a separation between the ears. The interconnection of the half oval portions and crown section, forms a head section.

Each of the above described elements has a uniform thickness such that the brush as a whole has a substantially uniform thickness. The brush is further defined by having a top and bottom surface. The shape created by the body and head sections results in a shape resembling the outline of any one of a variety of animal shapes, such as a cat, dog, rabbit or pig. The ears attached to the half oval portions further define the outline of an animal by representing ears on the head. The bristles of the brush are attached to the bottom surface and are generally conical in shape. The bristles are spacially arranged so that the maximum number of bristles can be used.

The brush may include a plurality of raised line structures which are integral with the top surface of the brush. These raised line structures can be arranged in a way to represent the facial features of the animal or may be used to define lettering or numbering. These raised line structures are generally parallel with the bristles.

The type of material used to manufacture the brush may be a plastic, rubber or other polymer that results in the brush being flexible enough to easily conform to the contours of the hand and to the surface of the animal's skin which is being brushed. Additionally, the bristles, which are made of the same type of material as the head and body sections, also are flexible enough to easily conform to the contours of the animal being brushed.

The advantage of the foregoing described invention is that the hand may be placed in a number of positions on the brush to accommodate effective brushing and comfort of the hand. Additionally, the flexible characteristic of the brush allows one to form the brush to fit the contours of the skin of the animal being brushed. Furthermore, because of the spacial arrangement and geometric configuration of the bristles, trapped hair remains in a substantially single layer that may be easily removed.

Additional advantages of this invention will become apparent from the following description, taken in conjunction with the accompanying drawings.

BRIEF DESCRIPTION OF THE DRAWINGS

FIG. 1 is a top perspective view of the brush showing a top surface of the brush;

FIG. 2 is bottom perspective view showing the bristle arrangement of the brush;

FIG. 3 is an end view showing the bristles in relation with the base portion of the brush;

FIGS. 4–7 illustrate some of the hand positions which may be used with either the right hand or the left hand;

FIG. 8 illustrates use of the brush on a domestic cat where the flexibleness of the brush is shown; and FIG. 9 illustrates the removal of collected hair from the brush wherein the collected hair remains in substantially a single layer.

BEST MODE FOR CARRYING OUT THE INVENTION

In accordance with this invention, a hand-held brush B is provided as shown in FIGS. 1 and 2. Conveniently, the brush has the general configuration of an animal which includes a relatively large oval body section 8 to which a smaller oval head section 10 is connected. Moving counterclockwise direction, the body 8 comprises a first half curved portion 12, a base portion 14 and a second half curved portion 16. At one intersection of body section 8 and head section 10 is a concave portion including a flat area 18. Beginning at concave portion with flat area 18, the head section 10 includes a second half oval portion 20, a second protruding ear portion 21, a curved crown portion 22 a first protruding ear portion 23 and first half oval portion 24. The other point of attachment between the body section 8 and the head section 10 is defined between first half curved portion 12 and first half oval portion 24 by a concave area 25.

As shown in FIG. 1, the brush B includes a top surface 26 and a peripheral side edge 28 of uniform width or thickness which extends around the body, head section and ears of the brush. The second protruding ear 21 and first protruding ear 23 represent the ears of an animal, such as a cat. The first half oval portion 24 and the second half oval portion 20 represent the outline of the head of an animal. The first half curve portion 12, the base portion 14 and the second half curve portion 16 define the body portion of an animal. Axis A—A represents a line which intersects the concave area 25 and the concave portion with flat area 18.

FIG. 2 shows a bottom surface 30 of the brush B. The bristles 32 extend away from the bottom surface 30 in a substantially perpendicular manner. The uniform thickness of side edge 28 is shown extending throughout the body section of the brush. The bristles may be arranged in any geometric configuration that results in bristle attachment throughout all areas of the bottom surface 30.

FIG. 3 shows the perpendicular arrangement of the bristles 32 in relation to the body section of the brush B. The uniform thickness of side edge 28 is also shown. Top surface 26 and bottom surface 30 define opposite sides of the brush body. The conical shape of the bristles 32 are arranged such that the larger end of the cone is attached to the head section and the body section of the brush, with the tapered end at a point farthest away from the brush. The bristles terminate at a substantially flat tip 33.

FIG. 4 illustrates one hand position that may be utilized. In this figure, the body 8 of the brush B is held in the palm of left hand LH with the thumb 42 placed along the second curved portion 16 of body 8 whereby the tip of the thumb terminates on or near the concave portion with flat area 18. The left forefinger 34 is placed on the curved crown portion 22. The remaining fingers, the left third finger 36, the left fourth finger 38, and the left fifth finger 40, are wrapped around the first half curve portion 12 whereby the left third finger 36 is placed on or near the concave area 25. In this position, the brush may be rotated in left hand LH in either a counterclockwise or clockwise direction to allow the body portion of the brush to comfortably fit within the palm of the left hand.

FIG. 5 shows a similar hand position as in FIG. 4, but using the right hand RH. The right thumb 52 is placed along the first half curved portion 12 and terminates at the concave area 25. The right forefinger 44, is placed on the curved crown portion 22 of head section 10. The remaining fingers, the right third finger 46, the right fourth finger 48 and the right fifth finger 50, are wrapped around the second half curved portion 16 of body section 8. Specifically, the right third finger 46 is placed on the concave portion with flat area 18. The right fourth finger 48 and the right fifth finger 50 are wrapped around the remaining portion of the second half curved portion 16.

FIG. 6 shows yet another possible hand position using the left hand LH in which the left thumb 42 is placed along the side edge 28 of the brush wherein the tip of the left thumb terminates at the concave portion with flat area 18. The left forefinger 34, accordingly, is wrapped around the brush at or near at the concave area 25. The remaining fingers, the left third finger 36, the left fourth finger 38, and the left fifth finger 40, are wrapped around the remaining portion of the first half curved portion 12.

FIG. 7 illustrates a similar hand position as in FIG. 6, but using the right hand RH. The right hand is arranged such that the right thumb 52 is placed along the side edge 28 of the brush. The tip of the right thumb 52 terminates at the concave area 25. The right forefinger 44 may be wrapped around the brush near or at the concave portion with flat area 18. The remaining fingers, the right third finger 46, the right fourth finger 48, and the right fifth finger 50, are wrapped around the remaining portion of the second half curve portion 16.

FIG. 8 illustrates use of the brush on a domestic cat C. The hand position in FIG. 8 is similar to that of the hand position illustrated in FIG. 5. The right forefinger 44, is placed on the curved crown portion 22. The remaining fingers, the right third finger 46, the right fourth finger 48 and the right fifth finger 50, are wrapped around the second half curved portion 16. Specifically, the right third finger 46 may be placed on the concave portion with flat area 18. The right fourth finger 48 and the right fifth finger 50 are wrapped around the remaining portion of the second half curved portion 16. The flexibleness of the bristles 32 and of the body section 8 and head section 10 of the brush are shown conforming to the back surface of the cat. Referring back to FIG. 1, the brush is shown flexing primarily along axis A—A with secondary flexing taking place throughout the body section 8 and head section 10 of the brush.

FIG. 9 shows trapped hair layer H being removed from the brush. Because of the type of material used to make the brush and the conical shape of the bristles, hair becomes trapped in a substantially single layer. Hair being trapped in this manner may be easily removed by grasping the hair layer H and pulling it away from the bristles. As shown, the left hand LH may be used to grasp the brush body while the other hand, right hand RH, pulls away the layer of hair H from the bristles 32.

From the foregoing, the advantages of this invention are readily apparent. A brush has been provided which allows the hand to be placed in a number of positions to accommodate effective brushing and comfort of the hand. The flexible nature of the brush allows it to conform to the contours of the animal being brushed. The unique shape of the brush provides for a number of possible hand positions. Furthermore, because of the configuration of the bristles and the material used in making the brush, hair may be removed in a substantially single layer.

It is to be appreciated that the FIGS. 4–7 display only common ways in which the brush may be grasped. Due to the unique curved shape of the brush body and head, there are a number of other hand positions that may be utilized to facilitate comfort of the hand and the contours of the surface being brushed.

This invention has been described in detail with reference to a particular embodiment thereof, but it will be understood that various other modifications can be effected within the spirit and scope of this invention.

I claim:

1. A brush for grooming animals wherein said brush has a top surface and a bottom surface, said brush comprising:
    an oval body section;
    a smaller oval head section connected to said body section;
    a protruding first ear integral with said smaller oval head section; and
    a second protruding ear spaced from said first protruding ear and integral with said smaller oval head section; and
    a plurality of bristles integral with said bottom surface of said brush.

2. A brush for grooming animals wherein said brush has a top surface and a bottom surface, said brush comprising:
    an oval body section which includes:
        a first half curve portion having a first and second ends;
        a base portion having a first and second ends, said first end of said base portion connected to said second end of said first half curve portion;
        a second half curve portion having a first and second ends, said second end of second half curve portion connected to said second end of base portion;

an oval head section smaller than said body section and which includes:

a first half oval portion having a first and second ends, said first end of first half oval portion connected to said first end of first half curve portion;

a flat area having first and second edges, said first edge of flat area connected to said first end of said second half curve portion;

a second half oval portion having a first and second ends, said first end of second half oval portion connected to said second edge of said flat area;

a first protruding ear having a first and second ends, said first end of said first protruding ear connected to said second end of said first half oval portion;

a curved crown having a first and second ends, said first end of crown connected to said second end of said first protruding ear; and a second protruding ear having a first and second ends, said first end of said second protruding ear connected to said second end of said curved crown and wherein said second end of said second protruding ear is connected to said second end of said second half oval; said body section and head section forming a closed figure; and a plurality of bristles integral with said bottom surface of said brush.

3. Apparatus, as claimed in claim 2, wherein:

said bristles are conical in shape.

4. Apparatus, as claimed in claim 3, wherein:

said bristles are flexible such that said bristles substantially conform to the shape of an animal's skin being brushed.

5. Apparatus, as claimed in claim 2, wherein:

said first and second half oval portions flex in relation to said first and second half curve portions whereby said brush conforms to the shape of an animal being brushed.

6. Apparatus, as claimed in claim 2, wherein:

said body section and said head section flex independently whereby said brush conforms to the shape of an animal being brushed.

* * * * *